Oct. 6, 1925.

M. R. KARGE ET AL 1,555,984

AUTOMATIC CLUTCH RELEASE MECHANISM

Filed Nov. 27, 1920    2 Sheets-Sheet 1

Oct. 6, 1925.

M. R. KARGE ET AL 1,555,984

AUTOMATIC CLUTCH RELEASE MECHANISM

Filed Nov. 27, 1920  2 Sheets-Sheet 2

Patented Oct. 6, 1925.

1,555,984

UNITED STATES PATENT OFFICE.

MAXWELL R. KARGE AND FERNAN O. CONILL, OF PHOENIX, NEW YORK.

AUTOMATIC CLUTCH-RELEASE MECHANISM.

Application filed November 27, 1920. Serial No. 426,844.

*To all whom it may concern:*

Be it known that we, MAXWELL R. KARGE and FERNAN O. CONILL, citizens of the United States and the Republic of Cuba, respectively, and residents of Phoenix, in the county of Oswego and State of New York, have invented a certain new and useful Automatic Clutch-Release Mechanism, of which the following is a specification.

This invention has for its object a particularly simple, compact, efficient and durable automatic clutch release operable by the relative rotary movement of two driven parts connected together by a coupling permitting a yielding relative rotary movement of said parts; and the invention consists in the novel features and in the combinations and constructions hereinafter set forth and claimed.

In describing this invention, reference is had to the accompanying drawings, in which like characters designate corresponding parts in all the views.

Figure 1:
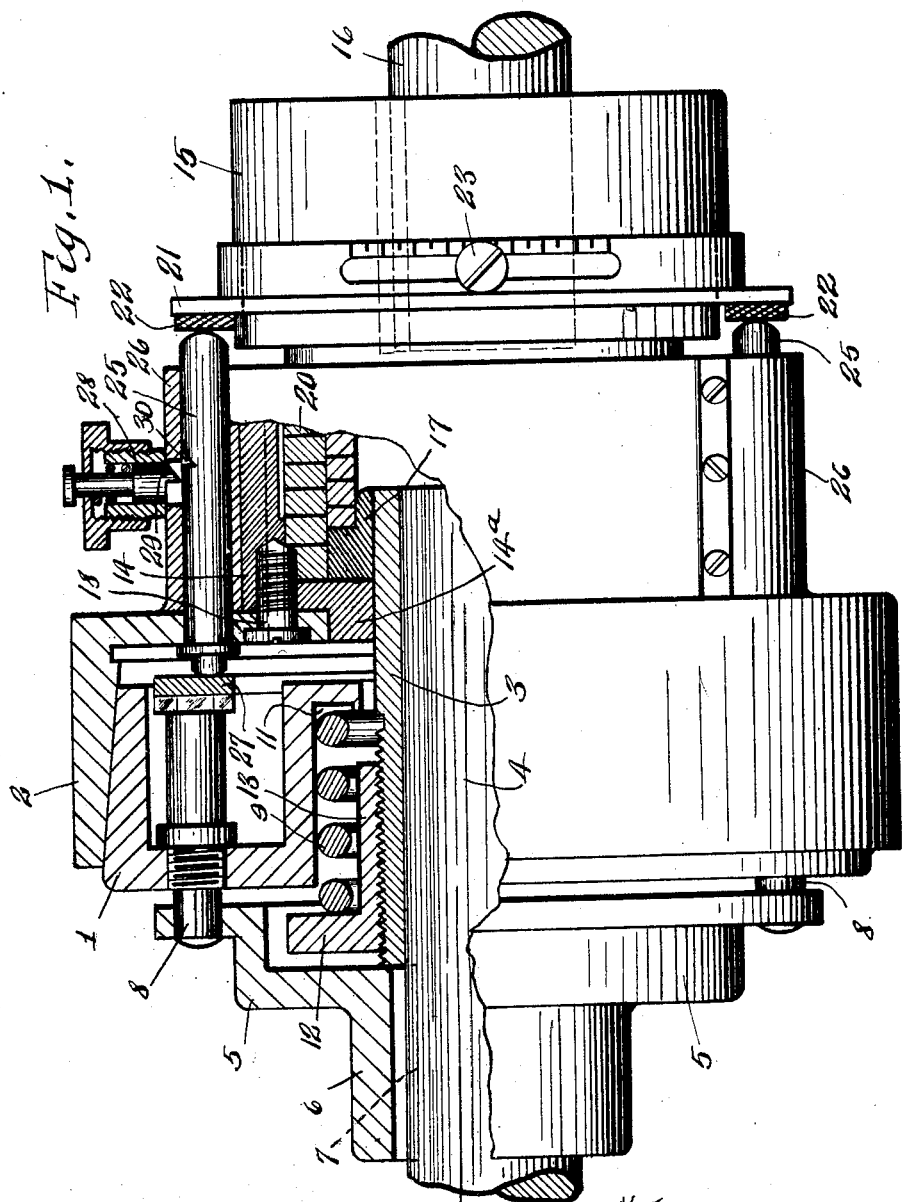
Figure 1 is an elevation, partly in section of this automatic release clutch.
Figure 2:
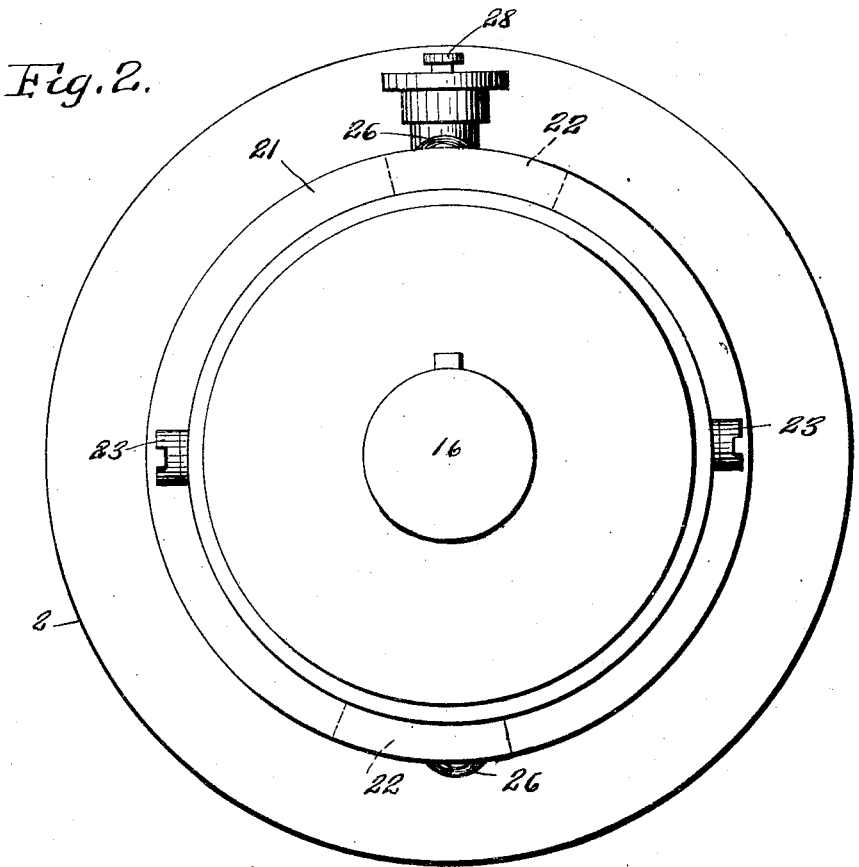
Figure 2 is an end elevation thereof.
Figure 3:
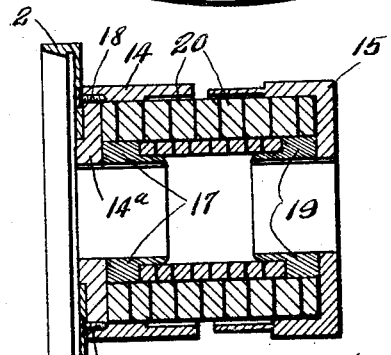
Figure 3 is a sectional view on a reduced scale of one type of flexible or yielding coupling used in connection with our automatic release.
Figure 4:
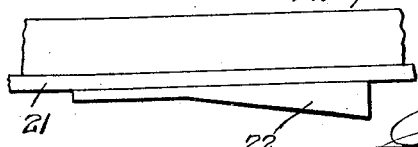
Figure 4 is a detail view of one of the cams.

This automatic clutch release mechanism comprises generally, driving and driven clutch sections, one of which, as the driving section, is shiftable axially into and out of engagement with the other clutch section and is normally held in engagement therewith by a spring, a driven shaft, a coupling including members or parts as headers, connected respectively to the driven clutch sections and to the shaft and yieldingly resistant means between the headers which permits a limited rotary movement of one part or header relatively to the other and means operated by such relative movement for shifting the driving clutch section out of engagement with the driven clutch section.

1 is a driving clutch section, and 2 the driven clutch section which as here shown constitutes a friction clutch of the cone type, although any other form of clutch may be used. The clutch section 1 is here illustrated as mounted on the sleeve 3 which is rotatably mounted on the driving shaft 4 and as connected to a head 5 to rotate therewith which head has a hub 6 mounted on and keyed to the shaft 4 at 7.

As shown, the clutch section 1 is provided with guide pins 8 which extend through perforations in the head 5, there being sufficient space between the head 5 and the clutch section 1 to permit axial shifting of the clutch section out of engagement with the driven clutch section 2. A compression spring 9 is arranged in an axial recess in the clutch section, which spring normally presses the clutch section into engagement with the driven clutch section 2, this spring thrusting at one end at 11 against the bottom of such recess and at its other end against an annular flange 12 of a spring abutment 13 threading on the sleeve 3. However, any other suitable form of clutch may be employed.

The coupling here shown embodies a torsion spring coupling of the type shown in the patent of Maxwell R. Karge, No. 1,387,726, August 16, 1921.

This coupling comprises headers or drums 14 and 15 mounted respectively on or rotatable with the driven clutch section 2 and on the driven shaft 16, the header 14 having a hub 14ª loosely mounted upon the sleeve 3 and also having an internal plug 17 loosely mounted on such sleeve, the plug forming an annular recess for the end coils of the torsion spring to be described. The header 14 is connected or secured to the clutch section 2 in any suitable manner, as by screws 18. The header or drum 15 is similar in construction to the header 14, it having an internal plug 19 similar to the plug 17 forming a recess in which the end coils of the torsion spring are held, the header 15 being keyed to the driven shaft 16. 20 designates the torsion spring which is usually of the form shown in the application of Maxwell R. Karge, Sr. No. 346,712 filed March 10, 1920, this spring having its end coils secured to the headers respectively. Owing to the use of the torsion spring relative rotary yielding movement of the headers is permitted when a restraining force or overload is carried by the shaft 16.

The means for automatically shifting the clutch section 1 out of engagement with the clutch section 2 upon a predetermined amount of relative rotary movement of the header 15 relatively to the header 14 when overload is applied to the shaft 16, in the illustrated embodiment of our invention comprises a cam as a cam ring 21 mounted on the header 15 and means carried by the header 14 for transmitting the movement of the cam to the clutch section 1 to shift the same axially out of engagement with the clutch section 2. The cam ring 21 is here shown as adjustable or rotatable in an arc about the header 15, and as having diametrically disposed wedges or cams 22 facing the header 14, the ring being held in its adjusted position in any suitable manner, as by clamping screws 23 extending through the slots in the ring 21 and threading in the header. Suitable graduations may be provided along the hub to position the ring so that the cams or wedges 22 will come into operation upon any predetermined overload of the shaft 16.

The means for transmitting the movement of these cams or wedges to the clutch section 1, as here shown comprises diametrically disposed shifters or push rods 25 arranged in suitable guides 26 on the header 14, these rods being arranged parallel to the axis of the header and having their outer ends arranged in the path of the cams 22 and their inner ends arranged to push against an annular surface provided on the clutch section 1, this annular surface being preferably provided on the ring 27 carried at the inner ends of the pins 8. The cam ring 22 can be so set by means of the screws 23 that the cams 22 will be spaced a predetermined distance back of (with respect to the direction of rotation of the headers) the outer ends of the rods 25 so that after the overload on the shaft 16 reaches a certain amount, the spring will be tensioned or twisted sufficiently to advance the cams into engagement with the rods 25 to move the same endwisely and shift the clutch section 1 out of engagement with the clutch section 2.

Suitable means may be provided for locking the clutch section 1 in its out position, this means being here shown as a spring-pressed latch or poppet 28 coacting with each of the rods 25 and carried by a housing or guide for such rod, each poppet having a tooth 29 for entering a notch 30 of the companion rod 25 when the rod has been pushed far enough to bring the notch into alinement with the tooth.

What we claim is:

1. In an automatic clutch release, the combination of driving and driven clutch sections, one being shiftable relatively to the other, a driven shaft, headers mounted respectively on the driven clutch section and on the driven shaft, a coiled torsion spring connecting the headers, means for moving the shiftable clutch section toward the other clutch section and cam means mounted on the header on the shaft, a shifter carried by the other header and arranged in the path of said cam means to be actuated by such means upon a predetermined relative turning movement of the headers whereby when the spring is subjected to a predetermined torque movement the shifter is actuated to release the clutch, substantially as and for the purpose described.

2. In an automatic clutch release, the combination of driving and driven clutch sections, one being shiftable axially relatively to the other, a driven shaft, headers mounted respectively on the driven clutch section and on the driven shaft, a coiled torsion spring connecting the headers, a spring for moving the shiftable clutch section toward the other clutch section, a cam ring mounted on the header on the shaft and adjustable about the same, a shifter carried by the other header and arranged in the path of the cam to be actuated thereby upon predetermined relative movement of the headers, the shifter coacting with the shiftable clutch section to shift the same outwardly against the action of the clutch spring upon predetermined relative rotary movement of the headers, substantially as and for the purpose described.

In testimony whereof, we have hereunto signed our names hereto at Syracuse, in the county of Onondaga, and State of New York, on the 30th day of October, 1920, and the 17th day of September, 1920, respectively.

MAXWELL R. KARGE.
FERNAN O. CONILL.